(12) United States Patent
Gebreselassie et al.

(10) Patent No.: US 12,096,782 B2
(45) Date of Patent: Sep. 24, 2024

(54) PET FOOD COMPOSITIONS AND METHODS FOR THE SAME

(71) Applicant: Hill's Pet Nutrition, Inc., Topeka, KS (US)

(72) Inventors: Eden Ephraim Gebreselassie, Lawrence, KS (US); Matthew Jackson, Topeka, KS (US); Dennis Jewell, Lawrence, KS (US)

(73) Assignee: Hill's Pet Nutrition, Inc., Overland Park, KS (US)

( * ) Notice: Subject to any disclaimer, the term of this patent is extended or adjusted under 35 U.S.C. 154(b) by 551 days.

(21) Appl. No.: 16/473,129

(22) PCT Filed: Dec. 20, 2017

(86) PCT No.: PCT/US2017/067492
§ 371 (c)(1),
(2) Date: Jun. 24, 2019

(87) PCT Pub. No.: WO2018/125693
PCT Pub. Date: Jul. 5, 2018

(65) Prior Publication Data
US 2019/0350226 A1 Nov. 21, 2019

Related U.S. Application Data

(60) Provisional application No. 62/439,205, filed on Dec. 27, 2016.

(51) Int. Cl.
*A23K 20/163* (2016.01)
*A23K 10/30* (2016.01)
*A23K 50/40* (2016.01)

(52) U.S. Cl.
CPC ........... *A23K 20/163* (2016.05); *A23K 10/30* (2016.05); *A23K 50/40* (2016.05)

(58) Field of Classification Search
CPC ....... A23K 20/163; A23K 50/40; A23K 10/30
(Continued)

(56) References Cited

U.S. PATENT DOCUMENTS 5,932,561 A 8/1999 Meyers et al.
6,517,831 B2 2/2003 Takebe et al.
(Continued)

FOREIGN PATENT DOCUMENTS

CN 101627799 1/2010
CN 102105068 A 6/2011
(Continued)

OTHER PUBLICATIONS

Fahey et al., Effects of short-chain fructooliogsaccahrides and galactooligosaccharides, individually and in combination, on nutrient digestibility, fecal fermentative metabolite concentrations and large bowel microbial ecology of healthy adult cats, J Anim. Sci. 89: 1736-1384.*
(Continued)

*Primary Examiner* — Donald R Spamer
*Assistant Examiner* — Philip A Dubois

(57) ABSTRACT

Pet food compositions and methods for increasing body weight and decreasing indoles in a feline having renal insufficiency are provided. The methods may include feeding the feline an effective amount of the pet food composition. The pet food composition may include fermentable fibers and betaine.

7 Claims, 3 Drawing Sheets

(58) Field of Classification Search
USPC .......................................................... 426/71
See application file for complete search history.

(56) References Cited

U.S. PATENT DOCUMENTS

| | | | |
|---|---|---|---|
| 9,771,199 | B2 | 9/2017 | Kerr et al. |
| 2004/0131657 | A1* | 7/2004 | Wester ..................... A23L 7/104 424/439 |
| 2006/0134091 | A1 | 6/2006 | Apajalahti et al. |
| 2013/0071519 | A1 | 3/2013 | Van Loo et al. |
| 2015/0216217 | A1* | 8/2015 | Devaux ................... A23L 33/30 426/654 |
| 2015/0257599 | A1* | 9/2015 | Ng .......................... A47J 42/34 241/169.1 |

FOREIGN PATENT DOCUMENTS

| | | |
|---|---|---|
| CN | 103039730 A | 4/2013 |
| CN | 103829103 A | 6/2014 |
| EP | 1214893 | 6/2002 |
| EP | 0969737 | 6/2003 |
| EP | 2386649 | 11/2011 |
| JP | S60133852 A | 7/1985 |
| JP | 2001008636 A | 1/2001 |
| JP | 2001502921 A | 3/2001 |
| JP | 2011041576 A | 3/2011 |
| JP | 2011527194 A | 10/2011 |
| JP | 2016069495 A | 5/2016 |
| JP | 2016079118 A | 5/2016 |
| WO | 2006/050585 | 5/2006 |
| WO | 2015/197089 | 12/2015 |
| WO | 2015197714 A1 | 12/2015 |

OTHER PUBLICATIONS

Effects of short-chain fructooliogsaccahrides and galactooligosaccharides, individually and in combination, on nutrient digestibility, fecal fermentative metabolite concentrations and large bowel microbial ecology of healthy adult cats, J Anim. Sci. 89:1736-1384.*

Birt al., 2013, "Resistant starch: Promise for improving human health," Advances in Nutrition 4(6):587-601.

Elliott, 2006, "Nutritional management of chronic renal disease in dogs and cats," Veterinary Clinics of North America Small Animal Practice 36(6):1377-1384.

Felizardo et al., 2016, "The microbiota and chronic kidney disease: A double edged sword," Clinical & Translational Immunology 5(6):e86.

Flint et al., 2012, "Microbial degradation of complex carbohydrates in the gut," Gut Microbes 3(4):289-306.

International Search Report and Written Opinion of the International Searching Authority in International Application No. PCT/US2017/067492, mailed Apr. 20, 2018.

Liu et al., 2014, "Betaine reduces serum uric acid levels and improves kidney function in hyperuricemic mice," Planta Medica 80(1):39-47.

McGregor et al., 2002, "Betaine supplementation decreases post-methionine hyperhomocysteinemia in chronic renal failure," Kidney International 61(3): 1040-1046.

Parnell et al., 2009, "Weight loss during oligofructose supplementation is associated with decreased ghrelin and increased peptide YY in overweight and obese adults," The American Journal of Clinical Nutrition 89(6): 1751-1759.

Sabatino et al., 2015, "Alterations of intestinal barrier and microbiota in chronic kidney disease," Nephrology Dialysis Transplantation 30(6): 924-933.

Ueland et al., 2005, "Betaine: a key modulator of one-carbon metabolism and homocysteine status," Clinical Chemistry and Laboratory Medicine (CCLM) 43(10): 1069-1075.

Vitetta et al., 2013, "Uremia and chronic kidney disease: The role of the gut microflora and therapies with pro- and prebiotics," Molecular Nutrition and Food Research 57(5):824-832.

Yasuda et al., 2006, "Supplemental dietary inulin affects the bioavailability of iron in corn and soybean meal to young pigs," The Journal of Nutrition 136:3033-3038.

Office Action issued in corresponding Japanese Patent Application No. 2019-534870 on May 12, 2020 with English language translation (8 pages).

Zheng, Jingui, Science on Agricultural Product Quality, Xiamen University Press, Dec. 31, 2004, p. 200.

Chen et al., "Chronic Renal Failure," Heilongjiang People's Press, Mar. 31, 1981, p. 169.

Huang et al., "Food Fiber and Human Health," Jindun Press, May 31, 2009, p. 61.

Liu et al., "New Essentials of Clinical Diagnosis and Treatment of Kidney Disease," Science and Technology Literature Press, Jun. 30, 2014, p. 330.

* cited by examiner

PET FOOD COMPOSITIONS AND METHODS FOR THE SAME

FIELD

The disclosure relates to pet food compositions including fermentable fibers and betaine as well as methods of using and making the same.

BACKGROUND

Renal insufficiency is defined by poor function of the kidneys. Renal insufficient pets may have a decreased ability to maintain body weight due to changes in physiology and gastrointestinal health associated with kidney disease potentially caused by changing both the kidney and the gut microbiota. As renal disease advances this becomes more acute and the loss of lean muscle mass and overall body weight is a strong contributor to loss of health and life from this disease.

The effect of prebiotics in modulating the gut microbiome is well documented. The presence of prebiotics in the gut favors the growth of saccharolytic bacteria, which produce short-chain fatty acids that are beneficial to the host. This decreases the proportion of proteolytic bacteria that mainly produce toxic nitrogenous waste that deteriorate kidney function (Sabatino et al., Nephrol Dial Transplant, 2014, 1-10; Elliott, Vet Clin Small Anim., 2006, 36, 1377-1384). Prebiotics have been reported to increase nutrient absorption (Yasuda et al., J Nutr., 2006, 136, 3033-38). Alternatively, other studies have shown the use of prebiotics to induce satiety and weight loss (Birt et al., Adv Nutr Int Rev J., 2013, 4, 587-601). Similarly, betaine is known to have an osmoprotective effect on kidneys (Liu et al., Mice Planta. Med., 2013, 80(1), 39-47) and decreases levels of homocysteine by serving as a methyl donor (McGregor et al., Kidney Int., 2002, 61(3), 1040-6). In addition, betaine acts as a chaperone to stabilize protein structure under denaturing conditions (Leland et al., Clin Chem Lab Med, 2005, 43(10), 1069-75). However, neither prebiotics nor betaine are known to increase body weight or body composition (Parnell et al., Am J Clin Nutr., 2009, 89(6), 1751-59).

Prebiotics impart benefit to kidney patients through their potential to modulate the composition and function of gut microbiota. Kidney patients have a predominantly proteolytic type of bacteria, which contribute to increased production of indole in the intestine. The absorbed indole is converted to various forms of indoles that are associated with deterioration of kidney function. To date, there has been no report showing the specific combination of ingredients capable of reducing indoles in renal cats.

Current pet food products do not adequately offer improvement of health related properties in renal cats. Such properties are, for example, to increase total body mass, bone mineral content, lean and/or fat in renal insufficient cats. Also, such properties are useful in decreasing indole in the intestine of renal insufficient cats. Accordingly, there is a need for pet food compositions to offer health improvement properties.

BRIEF SUMMARY

It has been surprisingly found that pet food compositions including fermentable fibers and betaine possess health improvement effects on renal insufficient cats. Such pet food compositions show an unexpected increase in total body mass, bone mineral content, lean and fat in renal insufficient cats. It has also been surprisingly and unexpectedly discovered that healthy cats fed the pet food compositions including fermentable fibers and betaine do not exhibit an increase in total body mass. Also, such pet food compositions show an unexpected decrease of indole in the intestine. It has also been surprisingly and unexpectedly discovered that pet food compositions including fermentable fibers and betaine reduce uremic toxins or prevent renal deficiency, namely, P-cresol sulfate, in healthy cats. It has further been surprisingly and unexpectedly discovered that pet food compositions including fermentable fibers and betaine reduce circulating levels of markers associated with collagen degradation, such as hydroxyproline, or preventing collagen degradation in healthy cats. It has also been surprisingly and unexpectedly discovered that pet food compositions including fermentable fibers and betaine increase circulating levels of omega-3 fatty acids (e.g., docosahexaenoate and eicosapentaenoate) in healthy cats.

In one embodiment, the pet food composition may include fermentable fibers and betaine. In certain embodiments, the composition may include a mixture of short-chain fructo-oligosaccharides (scFOS) and beta-glucan. In further embodiments, the beta-glucan is oat fiber. In certain embodiments, the beta-glucan is present in an amount of 0.1 to 0.2% by weight of the pet food composition. In certain embodiments, the fermentable fibers may be present at a molar ratio of between 2:1 to 4:1 scFOS to beta-glucan. In further embodiments, the fermentable fibers may be present at a molar ratio of 3:1 scFOS to beta-glucan. In certain embodiments, betaine may be present in an amount of 0.03 to 1% by weight of the pet food composition. In further embodiments, betaine may be present in an amount of 0.1 to 0.8% by weight of the pet food composition. In further embodiments, betaine may be present at 0.5% by weight of the pet food composition. In certain embodiments, scFOS may be present in an amount of 0.2 to 0.6% by weight of the pet food composition. In further embodiments, scFOS may be present in an amount of 0.3 to 0.4% by weight of the pet food composition.

In one embodiment, a method for increasing body weight in a feline with renal insufficiency is disclosed. The method may include providing an effective amount of a pet food composition including fermentable fibers and betaine. In certain embodiments, the fermentable fibers of the pet food composition may include a mixture of short-chain fructo-oligosaccharides (scFOS) and beta-glucan. In further embodiments, the beta-glucan is oat fiber. In certain embodiments, the beta-glucan may be present in an amount of 0.1 to 0.2% by weight of the pet food composition. In certain embodiments, the fermentable fibers may be present at a molar ratio of between 2:1 to 4:1 scFOS to beta-glucan. In further embodiments, the fermentable fibers may be present at a molar ratio of 3:1 scFOS to beta-glucan. In certain embodiments, betaine may be present in an amount of 0.03 to 1% by weight of the pet food composition. In further embodiments, betaine may be present in an amount of 0.1 to 0.8% by weight of the pet food composition. In further embodiments, betaine may be present at 0.5% by weight of the pet food composition. In certain embodiments, scFOS may be present in an amount of 0.2 to 0.6% by weight of the pet food composition. In further embodiments, scFOS may be present in an amount of 0.3 to 0.4% by weight of the pet food composition.

In one embodiment, a method for decreasing indoles in a feline with renal insufficiency is provided. The method may include providing an effective amount of a pet food composition including fermentable fibers and betaine. In certain embodiments the fermentable fibers may include a mixture of short-chain fructo-oligosaccharides (scFOS) and beta-glucan. In further embodiments, the beta-glucan is oat fiber. In certain embodiments, the beta-glucan may be present in an amount of 0.1 to 0.2% by weight of the pet food composition. In certain embodiments, the fermentable fibers may be present at a molar ratio of between 2:1 to 4:1 scFOS to beta-glucan. In further embodiments, the fermentable fibers may be present at a molar ratio of 3:1 scFOS to beta-glucan. In certain embodiments, betaine may be present in an amount of 0.03 to 1% by weight of the pet food composition. In further embodiments, betaine may be present in an amount of 0.1 to 0.8% by weight of the pet food composition. In further embodiments, betaine may be present at 0.5% by weight of the pet food composition. In certain embodiments, scFOS may be present in an amount of 0.2 to 0.6% by weight of the pet food composition. In further embodiments, scFOS may be present in an amount of 0.3 to 0.4% by weight of the pet food composition.

In one embodiment, a method for reducing uremic toxins or preventing renal deficiency in a healthy feline is provided. The method may include providing an effective amount of a pet food composition including fermentable fibers and betaine. In certain embodiments the fermentable fibers may include a mixture of short-chain fructo-oligosaccharides (scFOS) and beta-glucan. In further embodiments, the beta-glucan is oat fiber. In certain embodiments, the beta-glucan may be present in an amount of 0.1 to 0.2% by weight of the pet food composition. In certain embodiments, the fermentable fibers may be present at a molar ratio of between 2:1 to 4:1 scFOS to beta-glucan. In further embodiments, the fermentable fibers may be present at a molar ratio of 3:1 scFOS to beta-glucan. In certain embodiments, betaine may be present in an amount of 0.03 to 1% by weight of the pet food composition. In further embodiments, betaine may be present in an amount of 0.1 to 0.8% by weight of the pet food composition. In further embodiments, betaine may be present at 0.5% by weight of the pet food composition. In certain embodiments, scFOS may be present in an amount of 0.2 to 0.6% by weight of the pet food composition. In further embodiments, scFOS may be present in an amount of 0.3 to 0.4% by weight of the pet food composition.

In one embodiment, a method for reducing circulating levels of markers associated with collagen degradation or preventing collagen degradation in a healthy feline is provided. The method may include providing an effective amount of a pet food composition including fermentable fibers and betaine. In certain embodiments the fermentable fibers may include a mixture of short-chain fructo-oligosaccharides (scFOS) and beta-glucan. In further embodiments, the beta-glucan is oat fiber. In certain embodiments, the beta-glucan may be present in an amount of 0.1 to 0.2% by weight of the pet food composition. In certain embodiments, the fermentable fibers may be present at a molar ratio of between 2:1 to 4:1 scFOS to beta-glucan. In further embodiments, the fermentable fibers may be present at a molar ratio of 3:1 scFOS to beta-glucan. In certain embodiments, betaine may be present in an amount of 0.03 to 1% by weight of the pet food composition. In further embodiments, betaine may be present in an amount of 0.1 to 0.8% by weight of the pet food composition. In further embodiments, betaine may be present at 0.5% by weight of the pet food composition. In certain embodiments, scFOS may be present in an amount of 0.2 to 0.6% by weight of the pet food composition. In further embodiments, scFOS may be present in an amount of 0.3 to 0.4% by weight of the pet food composition.

In one embodiment, a method for increasing circulating levels of omega-3 fatty acids (e.g., docosahexaenoate and eicosapentaenoate) in healthy felines is provided. The method may include providing an effective amount of a pet food composition including fermentable fibers and betaine. In certain embodiments the fermentable fibers may include a mixture of short-chain fructo-oligosaccharides (scFOS) and beta-glucan. In further embodiments, the beta-glucan is oat fiber. In certain embodiments, the beta-glucan may be present in an amount of 0.1 to 0.2% by weight of the pet food composition. In certain embodiments, the fermentable fibers may be present at a molar ratio of between 2:1 to 4:1 scFOS to beta-glucan. In further embodiments, the fermentable fibers may be present at a molar ratio of 3:1 scFOS to beta-glucan. In certain embodiments, betaine may be present in an amount of 0.03 to 1% by weight of the pet food composition. In further embodiments, betaine may be present in an amount of 0.1 to 0.8% by weight of the pet food composition. In further embodiments, betaine may be present at 0.5% by weight of the pet food composition. In certain embodiments, scFOS may be present in an amount of 0.2 to 0.6% by weight of the pet food composition. In further embodiments, scFOS may be present in an amount of 0.3 to 0.4% by weight of the pet food composition.

In certain embodiments, a pet food composition obtained or obtainable by combining the ingredients as set forth in any of the preceding compositions and methods is provided.

DETAILED DESCRIPTION

Figure 1:
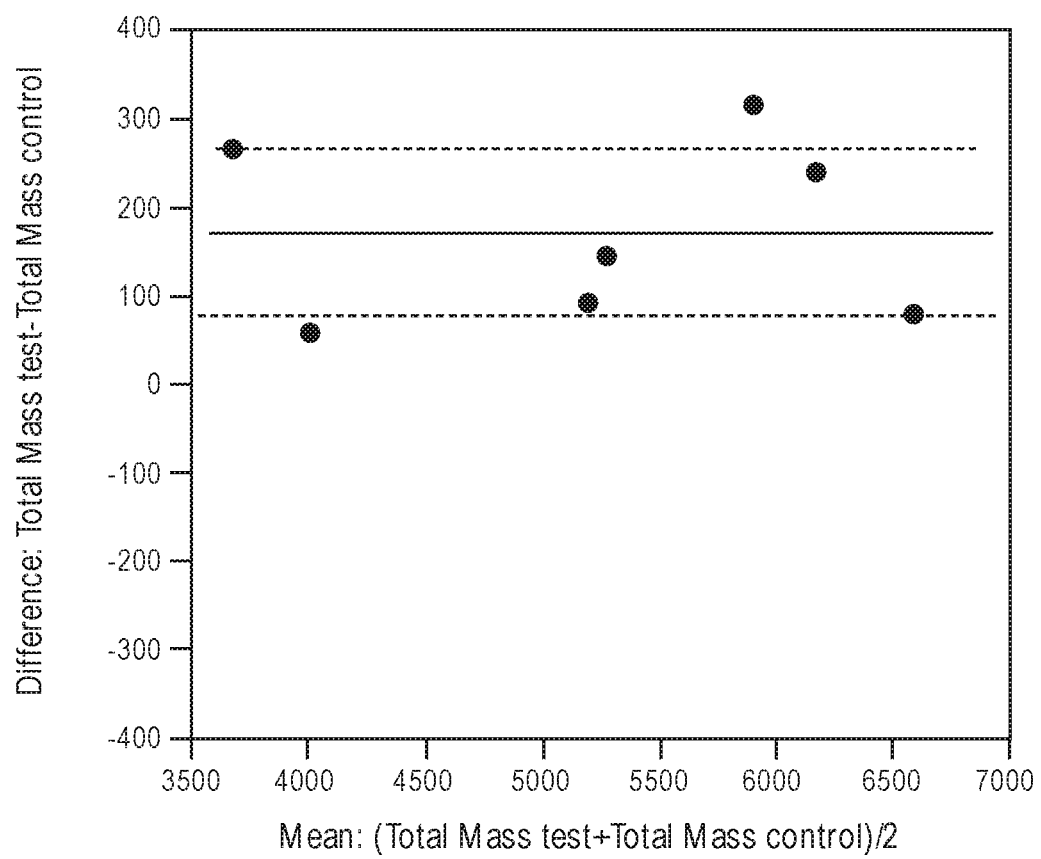
FIG. 1 is a graph plotting the difference in total mass of test subject subtracted by the total mass of control subject versus the mean of total mass of test subject and total mass of control subject.

The following description of various typical aspect(s) is merely exemplary in nature and is in no way intended to limit the disclosure, its application, or uses.

All references cited herein are hereby incorporated by reference in their entireties. In the event of a conflict in a definition in the present disclosure and that of a cited reference, the present disclosure controls.

As used throughout, ranges are used as shorthand for describing each and every value that is within the range. Any value within the range can be selected as the terminus of the range.

Unless stated otherwise, all percentages of composition components given in this specification are by weight based on a total composition or formulation weight of 100%.

As used herein, the words "preferred" and "preferably" refer to embodiments that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, the term "food" may refer not only to a food product which typically provides most, if not all, the nutrient value for a companion animal, but may also refer to such items as a snack, treat, supplement, and the like.

The term "effective amount" as used herein means that the amount of the composition may be of sufficient quantity to achieve the intended purpose, such as, for example, to increase total body mass, bone mineral content, lean and/or fat in a renal insufficient cat or to decrease indole in the intestine of a renal insufficient cat. Such effective activity may be achieved, for example, by administration of compositions of the present disclosure to an animal. An effective amount may be based on several factors, including an animal's ideal weight, the metabolizable energy of the composition, and frequency of feeding the animal one or more compositions of the present disclosure, e.g., once, twice, or three times daily, and other compositions fed to the animal.

The compositions and formulations as provided herein are described and claimed with reference to their ingredients, as is usual in the art. As would be evident to one skilled in the art, the ingredients may in some instances react with one another, so that the true composition of the final formulation may not correspond exactly to the ingredients listed. Thus, it should be understood that embodiments of the present disclosure extend to the product of the combination of the listed ingredients.

"Fermentable fibers" may be plant parts or carbohydrates resistant to digestion and absorption in the small intestine and may be fermented by colonic microorganisms. Examples of fermentable fibers may include simple carbohydrates such as short-chain fructo-oligosaccharides (scFOS), galacto-oligosaccharides (GOS), oligo-fructans and complex polysaccharides such as long chain inulin, beta-glucans, pectin, resistant starch as well as fruit or vegetable extracts rich in fiber, such as apple pomace, tomato pomace, cranberry pomace, beet pulp and citrus pulp.

It has been surprisingly found that pet food compositions including fermentable fibers and betaine possess health improvement effects on renal insufficient cats. Such pet food compositions show an unexpected increase in total body mass, bone mineral content, lean and fat in renal insufficient cats. It has also been surprisingly and unexpectedly discovered that healthy cats fed the pet food compositions including fermentable fibers and betaine do not exhibit an increase in total body mass. Also, such pet food compositions show an unexpected decrease of indole in the intestine. It has also been surprisingly and unexpectedly discovered that pet food compositions including fermentable fibers and betaine reduce uremic toxins or prevent renal deficiency, namely, P-cresol sulfate, in healthy cats. It has further been surprisingly and unexpectedly discovered that pet food compositions including fermentable fibers and betaine reduce circulating levels of markers associated with collagen degradation, such as hydroxyproline, or preventing collagen degradation in healthy cats. It has also been surprisingly and unexpectedly discovered that pet food compositions including fermentable fibers and betaine increase circulating levels of omega-3 fatty acids (e.g., docosahexaenoate and eicosapentaenoate) in healthy cats.

The pet food composition may include fermentable fibers and betaine. In certain embodiments, the fermentable fibers may be selected from short-chain fructo-oligosaccharides (scFOS), galacto-oligosaccharides (GOS), oligo-fructans and complex polysaccharides such as long chain inulin, beta-glucans, pectin, resistant starch as well as fruit or vegetable extracts rich in fiber, such as apple pomace, tomato pomace, cranberry pomace, beet pulp and citrus pulp. In certain embodiments, the fermentable fibers may be a single species of fermentable fiber. In further embodiments, the fermentable fibers may be mixed. In certain embodiments, the composition may include 0.2 to 0.6% by weight of the fermentable fibers. In certain embodiments, the composition may include 0.3 to 0.4% by weight of the fermentable fibers.

In certain embodiments, the fermentable fibers may include a mixture of short-chain fructo-oligosaccharides (scFOS) and beta-glucan. In certain embodiments, the scFOS and beta-glucan may be mixed at a ratio of 2:1 to 4:1 weight ratio. In a certain embodiment, the scFOS and beta-glucan may be mixed at a ratio of 3:1 weight ratio, i.e. 0.387% of scFOS and 0.129% of beta-glucan.

Beta glucans may be sugars found in the cell walls of bacteria, fungi, yeasts, algae, lichens, and plants, such as oats and barley. The beta-glucan may be from any source known to one skilled in the art. In a preferred embodiment, the beta-glucan is oat fiber. In certain embodiments, the beta-glucan is present in an amount of 0.05 to 0.5% by weight of the pet food composition. In certain embodiments, the beta-glucan is present in an amount of 0.01 to 0.3% by weight of the pet food composition. In certain embodiments, the beta-glucan is present in an amount of 0.1 to 0.2% by weight of the pet food composition.

In certain embodiments, the composition may include betaine in an amount of 0.03 to 1% by weight of the pet food composition. In certain embodiments, the composition may include betaine in an amount of 0.05 to 0.8% by weight. In certain embodiments, the composition may include betaine in an amount of 0.1 to 0.8% by weight of the pet food composition. In a further embodiment, the composition may include betaine at 0.5% by weight of the pet food composition.

In certain embodiments, the composition may include scFOS and oat fiber at a 3:1 weight ratio. In a further embodiment, the composition may include scFOS and oat fiber at a 3:1 weight ratio and betaine at 0.5 wt %. In a further embodiment, the composition may include scFOS and oat fiber, having a combined total wt % of 0.5, at a 3:1 weight ratio and betaine at 0.5 wt %.

In some embodiments, fermentable fibers and betaine may be present in a combined amount of 0.0007 to 3% by weight of the pet food composition. In a further embodiment, the fermentable fibers and betaine may be present in a combined amount of 0.001 to 0.05% by weight of the pet food composition. In a further embodiment, the fermentable fibers and betaine may be present in a combined amount of 0.003 to 0.011% by weight of the pet food composition. In a further embodiment, the fermentable fibers and betaine may be present in a combined amount of 0.005 to 0.009% by weight of the pet food composition. In further embodiments, fermentable fibers and betaine may be present in a combined amount 0.007 to 0.01% by weight of the pet food composition. In certain embodiments, the fermentable fibers and betaine may be present in an amount of about 1% by weight of the pet food composition.

In certain aspects, a method to increase body weight in a feline with renal insufficiency is disclosed. The method may include providing an effective amount of a pet food composition including fermentable fibers and betaine. In certain embodiments, the pet food composition may include scFOS and oat fiber at a 3:1 weight ratio. In a further embodiment, the pet food composition may include scFOS and oat fiber at a 3:1 weight ratio and betaine at 0.5 wt %. In a further embodiment, the method may include feeding a composition including scFOS and oat fiber, having a combined total wt % of 0.5, at a 3:1 weight ratio and betaine at 0.5 wt %.

In certain aspects, a method to decrease indoles in a feline with renal insufficiency is disclosed. The method may include providing an effective amount of a pet food composition including fermentable fibers and betaine. In certain embodiments, the pet food composition may include scFOS and oat fiber at a 3:1 weight ratio. In a further embodiment, the method may include feeding a composition including scFOS and oat fiber, having a combined total wt % of 0.5, at a 3:1 weight ratio and betaine at 0.5 wt %.

In certain aspects, a method for reducing uremic toxins or preventing renal deficiency in healthy felines is disclosed. The method may include providing an effective amount of a pet food composition including fermentable fibers and betaine. In certain embodiments, the pet food composition scFOS and oat fiber at a 3:1 weight ratio. In a further embodiment, the method may include feeding a composition including scFOS and oat fiber, having a combined total wt of 0.5, at a 3:1 weight ratio and betaine at 0.5 wt %.

In certain aspects, a method for reducing circulating levels of markers associated with collagen degradation or preventing collagen degradation in healthy felines is disclosed. The method may include providing an effective amount of a pet food composition including fermentable fibers and betaine. In certain embodiments, the method may include feeding a pet food composition having scFOS and oat fiber at a 3:1 weight ratio. In a further embodiment, the method may include feeding a composition including scFOS and oat fiber, having a combined total wt % of 0.5, at a 3:1 weight ratio and betaine at 0.5 wt %.

In certain aspects, a method for increasing circulating levels of omega-3 fatty acids (e.g., docosahexaenoate and eicosapentaenoate) in healthy catsin healthy felines is disclosed. The method may include providing an effective amount of a pet food composition including fermentable fibers and betaine. In certain embodiments, the method may include feeding a pet food composition having scFOS and oat fiber at a 3:1 weight ratio. In a further embodiment, the method may include feeding a composition including scFOS and oat fiber, having a combined total wt % of 0.5, at a 3:1 weight ratio and betaine at 0.5 wt %.

Pet food compositions may contain protein, fat, carbohydrate, dietary fiber, and/or nutritional balancing agents. Specific suitable amounts for each component in a composition will depend on a variety of factors such as the species of animal consuming the composition; the particular components included in the composition; the age, weight, general health, sex, and diet of the animal; the animal's consumption rate; and the like. Thus, the component amounts may vary widely, and may even deviate from the proportions set forth herein.

A "nutritionally complete diet" is a diet that may include sufficient nutrients for maintenance of normal health of a healthy animal on the diet. In certain aspects, the pet food composition(s) may be blended with a nutritionally complete diet and/or balanced food diet.

For example, a nutritionally complete and balanced dog food composition may include: about 0 to about 90%, preferably about 5% to 60%, by weight of carbohydrates; about 5% to about 70%, preferably about 10% to about 60%, more preferably about 20% to about 50%, by weight of protein: about 1% to about 50%, preferably about 2% to about 40%, more preferably about 3% to about 15%, by weight of fat; about 0.1% to about 40%, preferably about 1% to about 30%, more preferably about 15% to about 50%, by weight of total dietary fiber; about 0 to about 15%, preferably about 2% to about 8%, by weight of vitamins and minerals, antioxidants, and other nutrients which support the nutritional needs of the animal.

Protein may be supplied by any of a variety of sources known by those skilled in the art, including plant sources, animal sources, or both. Animal sources may include, for example, meat, meat by-products, seafood, daily, eggs, etc. Meats may include, for example, the flesh of poultry, fish, and mammals (e.g., cattle, pigs, sheep, goats, and the like). Meat by-products may include, for example, lungs, kidneys, brain, livers, and stomachs and intestines (freed of all or essentially all their contents). The protein can be intact, almost completely hydrolyzed, or partially hydrolyzed. The amount of "crude protein" in a composition disclosed herein may be determined based on the amount of nitrogen in the composition according to methods familiar to one of skill in the art. As contemplated herein, the compositions may include from about 5% to about 70% protein, from about 10% to about 60% protein, from about 20% to about 50% protein, from about 25% to about 40% protein, and from about 29% to about 38% protein.

In certain embodiments, the nutritionally complete pet food compositions disclosed herein may include fat. Sources of fat for the compositions can be supplied by any of a variety of sources known by those skilled in the art, including meat, meat by-products, fish oil, and plants. Plant fat sources may include wheat, flaxseed, rye, barley, rice, sorghum, corn, oats, millet, wheat germ, corn germ, soybeans, peanuts, and cottonseed, as well as oils derived from these and other plant fat sources. As contemplated herein, the compositions may include from about 1% to about 20% fat, from about 2% to about 18% fat, from about 3% to about 15% fat, from about 7% to about 14% fat, and from about 9% to about 12% fat.

In certain embodiments, the pet food compositions disclosed herein may include fat and carbohydrate. The fat and carbohydrate food ingredient is obtained from a variety of sources such as animal fat, fish oil, vegetable oil, meat, meat by-products, grains, other animal or plant sources, and mixtures thereof. Grains may include wheat, corn, barley, and rice.

In certain embodiments, the pet food compositions disclosed herein may include fiber. The fiber food ingredient is obtained from a variety of sources such as vegetable fiber sources, e.g., cellulose, beet pulp, peanut hulls, and soy fiber.

The compositions may further contain additives known in the art. Preferably, such additives may be present in amounts that do not impair the purpose and effect provided by the fermentable fibers and the betaine. Examples of contemplated additives may include, for example, substances that may be functionally beneficial to weight management, substances with a stabilizing effect, processing aids, substances that enhance palatability, coloring substances, and substances that provide nutritional benefits.

Contemplated substances that may provide a benefit for weight management may include, for example, nonfermentable fiber, carnitine, chrominium-picolinate, and the like.

Contemplated stabilizing substances may include, for example, substances that tend to increase the shelf life of the composition. Potentially suitable examples of such substances may include, for example, preservatives, antioxidants, synergists and sequestrants, packaging gases, stabilizers, emulsifiers, thickeners, gelling agents, and humectants. Examples of emulsifiers and/or thickening agents may include, for example, gelatin, cellulose ethers, starch, starch esters, starch ethers, and modified starches.

Contemplated additives for coloring, palatability, and nutritional purposes may include, for example, colorants; iron oxide, sodium chloride, potassium citrate, potassium chloride, and other edible salts; vitamins; minerals; and flavoring. The amount of such additives in a composition typically is up to 5% (dry basis of the composition).

Supplements may include, for example, a feed used with another feed to improve the nutritive balance or performance of the total. Contemplated supplements may include compositions that may be fed undiluted as a supplement to other feeds, offered free choice with other parts of an animal's ration that may be separately available, or diluted and mixed with an animal's regular feed to produce a complete feed. The Association of American Feed Control Officials (AAFCO), for example, provides a discussion relating to supplements in the American Feed Control Officials, Inc. Official Publication, p. 220 (2003). Supplements may be in various forms including, for example, powders, liquids, syrups, pills, etc.

Methods for manufacturing a pet food composition including fermentable fibers and betaine is provided. In certain embodiments, the pet food composition may be in solid or liquid form. In certain embodiments, the pet food composition may be in dry or wet form.

Compositions may be prepared in a canned or wet form using conventional pet food processes. In one contemplated embodiment, ground animal and poultry proteinaceous tissues is mixed with the other ingredients, including fish oils, cereal grains, other nutritionally balancing ingredients, special purpose additives (e.g., vitamin and mineral mixtures, inorganic salts, cellulose and beet pulp, bulking agents, and the like); and water sufficient for processing is also added. These ingredients may preferably be mixed in a vessel suitable for heating while blending the components. Heating of the mixture may be effected using any suitable manner, such as, for example, by direct steam injection or by using a vessel fitted with a heat exchanger. Following the addition of the last ingredient, the mixture is heated to a temperature range of from about 50° F. to about 212° F. Temperatures outside this range may be acceptable, but may be commercially impractical without the use of other processing aids. When heated to the appropriate temperature, the material will typically be in the form of a thick liquid. The thick liquid is filled into cans. A lid is applied, and the container is hermetically sealed. The sealed can is then placed into conventional equipment designed to sterilize the contents. This is usually accomplished by heating to temperatures of greater than about 230° F. for an appropriate time, which is dependent on, for example, the temperature used and the composition.

Compositions may be prepared in a dry form using conventional processes. In one contemplated embodiment, dry ingredients, including, for example, animal protein sources, plant protein sources, grains, etc., may be ground and mixed together. Moist or liquid ingredients, including fats, oils, animal protein sources, water, etc., may then be added to and mixed with the dry mix (which, in a contemplated embodiment, may include fermentable fibers and betaine). The mixture is then processed into kibbles or similar dry pieces. Kibble is often formed using an extrusion process in which the mixture of dry and wet ingredients is subjected to mechanical work at a high pressure and temperature, and forced through small openings and cut off into kibble by a rotating knife. The wet kibble is then dried and optionally coated with one or more topical coatings which may include, for example, flavors, fats, oils, powders, and the like. Kibble also can be made from the dough using a baking process, rather than extrusion, wherein the dough is placed into a mold before dry-heat processing.

In certain embodiments, the fermentable fibers and betaine may be included in animal treats. Treats may include compositions that may be given to an animal to entice the animal to eat during a non-meal time, e.g., dog bones for canines. Treats may be nutritional wherein the composition includes one or more nutrients, and may have a composition as described above for food. Non-nutritional treats encompass any other treats that are nontoxic. The fermentable fibers and betaine may be coated onto the treat, incorporated into the treat, or both.

In certain embodiments, the fermentable fibers and betaine may be included in animal toys. Toys may include chewable toys such as artificial bones. The fermentable fiber and betaine can form a coating on the surface of the toy or on the surface of a component of the toy, be incorporated partially or fully throughout the toy, or both. In one embodiment, the fermentable fiber and betaine is orally accessible by the intended user. There are a wide range of suitable toys currently marketed, e.g., U.S. Pat. Nos. 5,339,771, 5,419,283, and references disclosed therein. The fermentable fibers and the betaine may be provided in both partially consumable toys, e.g., toys including plastic components, and fully consumable toys, e.g., rawhides and various artificial bones. Further, the fermentable fibers and the betaine may be provided in toys for both human and non-human use, particularly for companion, farm, and zoo animal use, and particularly for dog, cat, or bird use.

In preparing the compositions, the components may be adjusted so that the fermentable fibers and betaine may be present in the composition at a concentration of at least 0.01%, preferably from about 0.01% to about 4%, most preferably from about 0.5% to about 2% by weight of the composition. The fermentable fibers and betaine may be incorporated into the composition during the processing of the formulation, such as during and/or after mixing of other components of the composition. Distribution of these components into the composition is accomplished by conventional means.

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

EXAMPLE 1

Animal Testing of Food Containing Fermentable Fibers and Betaine

A total of seven renal deficient cats were maintained on a control food (brewers rice, pork fat, chicken, egg product, whole grain corn, dried beet pulp, chicken liver flavor, powdered cellulose, menhaden fish meal, lactic acid, calcium carbonate, potassium chloride, choline chloride, potassium citrate, vitamins (Vitamin E supplement, L-ascorbyl-2-polyphosphate (source of Vitamin C), niacin supplement, thiamine mononitrate, pyridoxine hydrochloride, calcium pantothenate, vitamin A supplement, riboflavin supplement, vitamin B12 supplement, biotin, folic acid, vitamin d3 supplement), iodized salt, taurine, minerals (ferrous sulfate, zinc oxide, copper sulfate, manganous oxide, calcium iodate, sodium selenite), mixed tocopherols for freshness, L-tryptophan, DL-methionine). The test food contained betaine (0.5 wt %) and fermentable fibers bundle in addition to all ingredients present in the control food. The fermentable fibers in the test food were composed of fermentable simple fiber (0.387 wt %) and a complex fermentable fiber (beta-glucan, 0.129 wt % at 3 to 1 ratio. The cats were divided into a test group of 4 cats and a control group of 3 cats. Cats in the control group were fed the control food for two months. Cats in the test group were fed the test food for the same duration. After two months, a cross-over was performed so that cats in the control group received the test food while cats in the test group were fed the control food for the next two months. At the end of each two month feeding period, dual-energy x-ray absorptiometry (DEXA) measurements were taken to compare body composition of the renal cats on the control versus the test food group.

Figures 2A, 2B, 2C:
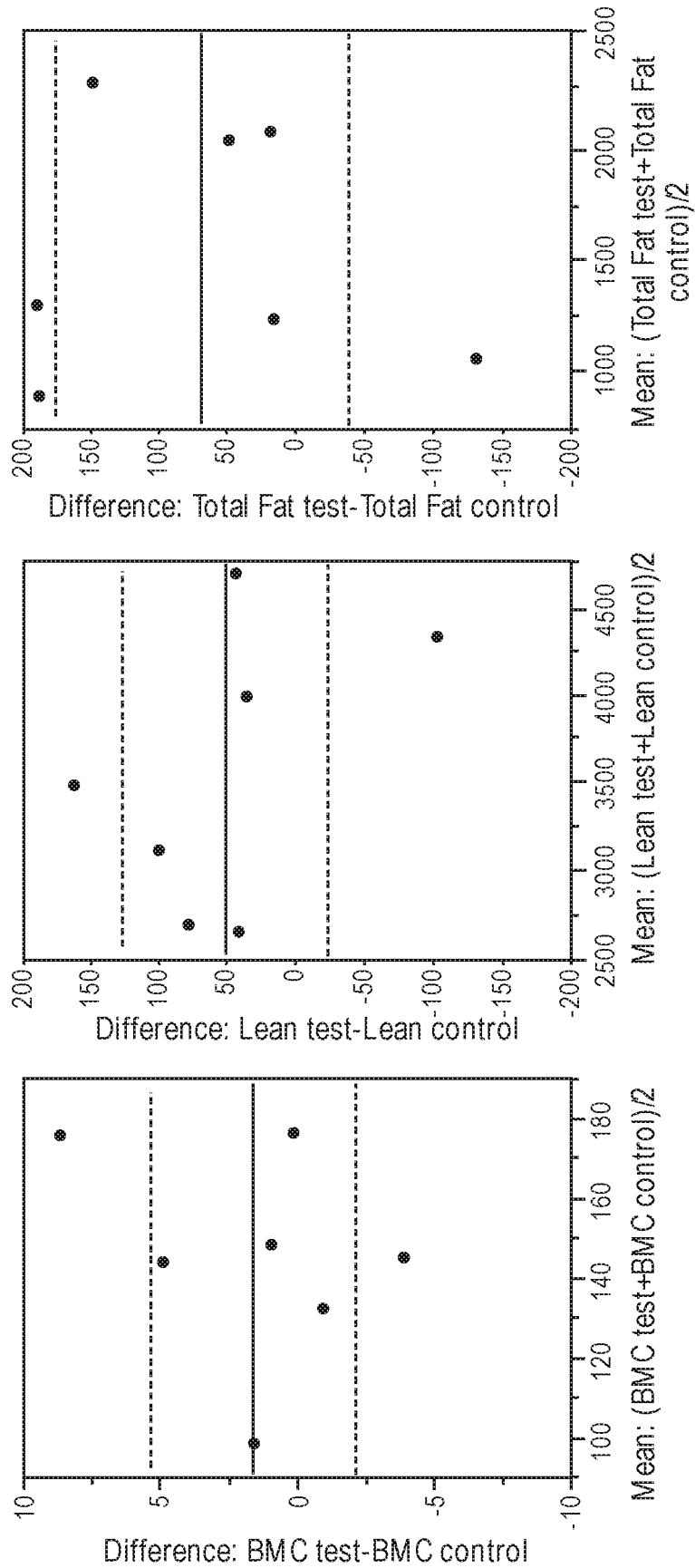
FIG. 2A is a graph plotting bone mineral content (BMC) of test subject subtracted by the BMC of the control subject versus the mean of the test and control BMC's.
FIG. 2B is a graph plotting the lean body mass of the test subject subtracted by the lean body mass of a control subject versus the average lean body mass of the test and control subject.
FIG. 2C is a graph plotting the total fat of the test subject subtracted by the total fat of a control subject versus the average of total fat of both the test and control subject.

In this study, the cats fed the test food had a significantly higher body mass (p<0.01) with the test food resulting in an average weight of 5328 grams as compared to the control food 5162 grams (standard error 39.6). All cats had a higher body weight on the test food (see FIG. 1) compared to the control food. This was the result of an increase in bone, lean and fat (see FIG. 2). Similar food intake was observed in both treatments implicating the result was not a response to change in food intake.

EXAMPLE 2

Effect of Fermentable Fibers and Betaine on In Vivo Indoles

Figure 3:
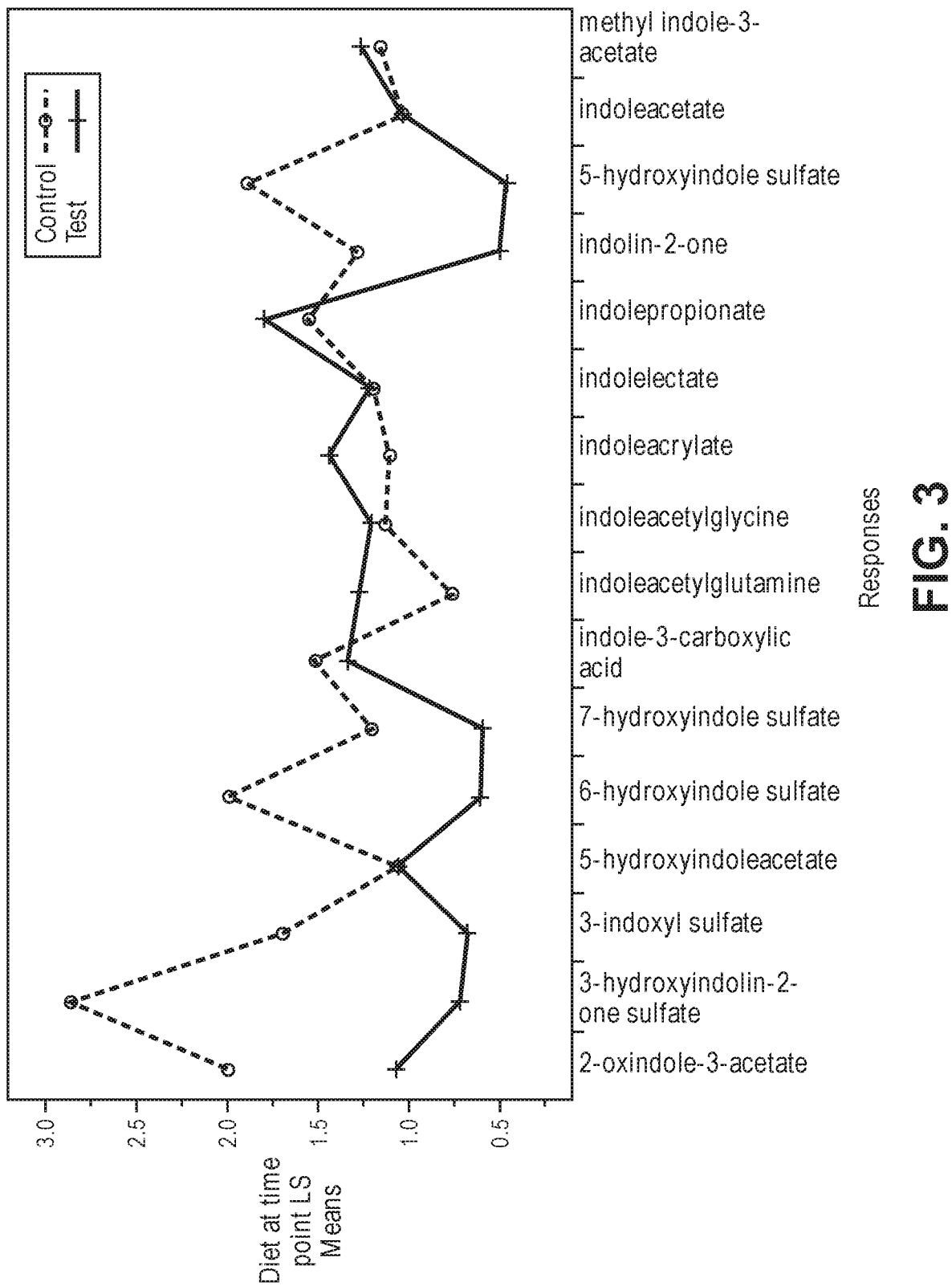
FIG. 3 is a graph depicting the diet at time point least squares (LS) means versus particular indole compounds.

This analysis was performed using blood samples collected from the cats of Example 1 at the end of both two month feeding periods. Relative concentration of uremic toxins was analyzed and reported in FIG. 3.

EXAMPLE 3

The control and test foods of Example 1 were evaluated on healthy felines/cats. Particularly, 16 healthy cats were randomly assigned to a control group or a test group, and fed the control food or the test food for two months, respectively. The body weights of the healthy cats in each group were measured weekly and blood samples were collected at the end of each month. The amount of uremic toxins, namely, P-cresol sulfate, were measured from the blood samples along with the levels of hydroxyproline and omega-3 fatty acids, docosahexaenoate (NIA) and eicosapentaenoate (EPA). The results of the evaluation of the pet food composition on healthy cats are summarized in Table 1.

TABLE 1

|  | Control Food | Test Food |
| --- | --- | --- |
| Body Weight (g) | 5136.78 ± 210.97 | 5377.89 ± 365.41 |
| P-cresol Sulfate | 1.205 | 0.665 |
| Hydroxyproline | 1.122 | 0.793 |
| DHA | 0.95 | 1.387 |
| EPA | 1.092 | 1.663 |

As indicated in Table 1, feeding healthy felines did not significantly affect the body weight of the healthy cats (P=0.57). Accordingly, it should be appreciated that the increase in the body weight of the felines having renal deficiencies in Example 1 is attributed to the presence/addition of the betaine and fermentable fibers of the test food. Particularly, feeding renal cats the test food results in a significant increase in body weight.

Table 1 also indicated that feeding healthy cats the test food significantly decreased circulating levels of P-cresol sulfate (P=0.004). It should be appreciated that P-cresol is a by-product of microbial fermentation of aromatic amino acids such as tyrosine and phenyl alanine by gut bacteria. In the liver, P-cresol is converted to P-cresol sulfate, and subsequently removed by the kidney. P-cresol sulfate is a uremic toxin known to deteriorate kidney function. Accordingly, the results surprisingly and unexpectedly demonstrate that feeding healthy cats the test food may prevent the deterioration of kidney function, or prevent renal deficiency in healthy cats.

Table 1 further indicated that feeding healthy cats the test food significantly decreased circulating levels of hydroxyproline (P<0.0001). It should be appreciated that hydroxyproline is a marker for collagen degradation that has been linked to kidney fibrosis, and increased blood levels of hydroxyproline indicates a limited ability of kidneys to regenerate after injury. Accordingly, the results surprisingly and unexpectedly demonstrate that feeding healthy cats the test food may improve collagen integrity, improve kidney health, and facilitate regeneration of kidneys after injury.

Table 1 also indicates that feeding healthy cats the test food significantly increased circulating levels of DHA (P=0.0005) and EPA (P=0.187). It should be appreciated that increasing circulating levels of omega-3 fatty acids, such as DHA and EPA, may contribute to improved overall health. For example, increasing circulating levels of omega-3 fatty acids may improved cardiovascular function, immune function, cognitive function, and other functions. It should further be appreciated that both the control and test foods had substantially similar levels/amounts of DHA (0.03 weight %) and EPA (0.02 weight %). Accordingly, the increased circulating omega-3 fatty acids upon feeding the test food is nothing short of surprising and unexpected. Without being bound by theory, it is believed that the addition of the betaine and fermentable fibers in the test food may increase uptake and/or reduce degradation of the omega-3 fatty acids.

While the present invention has been described with reference to embodiments, it will be understood by those skilled in the art that various modifications and variations may be made therein without departing from the scope of the present invention.

What is claimed is:

1. A cat food composition for renal cats, comprising fermentable fibers and betaine,
    wherein the fermentable fibers comprise a combination of simple carbohydrates and complex carbohydrates,
    wherein the simple carbohydrates comprise short chain fructo-oligosaccharides (scFOS) present in an amount ranging from 0.3 wt % to 0.4 wt %, based on the total weight of the cat food composition;
    wherein the complex carbohydrates comprise beta-glucans present in an amount ranging from 0.1 wt % to 0.2 wt %, based on the total weight of the cat food composition;
    wherein a weight ratio of the simple carbohydrates to the complex carbohydrates is about 3:1, and
    wherein the betaine is present in an amount of 0.5 wt %, based on the total weight of the cat food composition.

2. The cat food composition of claim 1, wherein the beta-glucan is oat fiber.

3. The cat food composition of claim 1, wherein the cat food composition is a dry form or kibble.

4. The cat food composition of claim 1, wherein:
the scFOS are present in an amount of about 0.387 wt %, based on the total weight of the cat food composition; and
the beta-glucans are present in an amount of about 0.129 wt %, based on the total weight of the cat food composition.

5. The cat food composition of claim 4, wherein the simple carbohydrate consists of the scFOS and the complex carbohydrate consists of the beta-glucans.

6. The cat food composition of claim 1, wherein the simple carbohydrate consists of the scFOS and the complex carbohydrate consists of the beta-glucans.

7. The cat food composition of claim 1, wherein the cat food composition is a canned or wet form.

\* \* \* \* \*